United States Patent
Baluja

(10) Patent No.: US 11,592,321 B1
(45) Date of Patent: Feb. 28, 2023

(54) DYNAMIC COMPENSATION FOR MAGNETOSTRICTIVE SENSORS

(71) Applicant: ABB Schweiz AG, Baden (CH)

(72) Inventor: Wilfredo Fernando Baluja, Warminster, PA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/490,183

(22) Filed: Sep. 30, 2021

(51) Int. Cl.
*G01D 5/48* (2006.01)
*G01D 18/00* (2006.01)

(52) U.S. Cl.
CPC ............. *G01D 5/485* (2013.01); *G01D 18/00* (2013.01)

(58) Field of Classification Search
CPC ................................ G01D 5/485; G01D 18/00
See application file for complete search history.

(56) References Cited

U.S. PATENT DOCUMENTS

| | | | | |
|---|---|---|---|---|
| 6,351,117 B1 * | 2/2002 | Ehling | ................... | G01B 7/003 324/207.13 |
| 8,402,822 B2 | 3/2013 | Hopper | | |
| 2007/0085726 A1 * | 4/2007 | Steinich | ................. | G01D 5/485 342/52 |

FOREIGN PATENT DOCUMENTS

| CN | 213481235 U | * | 6/2021 | ............... G01B 7/02 |
|---|---|---|---|---|
| GB | 2489107 A | * | 9/2012 | ............... G01B 7/24 |

* cited by examiner

*Primary Examiner* — Jay Patidar
(74) *Attorney, Agent, or Firm* — Armstrong Teasdale LLP

(57) ABSTRACT

A system for dynamically adjusting an operation of a magnetostrictive position sensor is provided. The system includes a controller configured to receive an electrical signal from the magnetostrictive position sensor that includes a response pulse, identify factory calibration data that correlates initial recorded values of amplitudes of response pulses received from the magnetostrictive position sensor at different locations of a position magnet along a length of the magnetostrictive position sensor, identify an initial amplitude of the response pulse based on the factory calibration data, calculate a difference between the initial amplitude and an amplitude of the response pulse, determine if the difference is greater than a threshold value, and generate an alert in response to determining that the difference is greater than the threshold value.

20 Claims, 6 Drawing Sheets

DYNAMIC COMPENSATION FOR MAGNETOSTRICTIVE SENSORS

BACKGROUND

The field of the disclosure relates to sensors, and more particularly, to magnetostriction sensors.

When a ferromagnetic material (e.g., iron, nickel, cobalt etc.) is subjected to an external magnetic field, the magnetic domains within the material align, creating internal stress that causes the shape or the dimension of the materials to change. This phenomenon is referred to as magnetostriction. Conversely, when a magnetostrictive material is subjected to a stress, it's magnetic properties will change. This is known as the Villari effect.

Another manifestation of magnetostriction is the Wiedemann effect. When a wire is subjected to a magnetic field orientation parallel to its length, and a current is passed through the wire, then the wire experiences torsion strain at the location where the magnetic field occurs. In magnetostriction sensors, the wire may be referred to as a waveguide.

FIG. 1 is simplified diagram of a magnetostriction sensor 100 as known in the art. Sensor 100 includes a sensor element head 102, a waveguide 104, and a position magnet 106. Waveguide 104 is protected by a sensing element protective tube 108. A magnetic field 110 is provided by position magnet 106. Position magnet 106 is attached to a moving portion of sensor 100 that is measured. Short pulses (e.g., 1-3 microseconds) of current are applied to waveguide 104, which may be referred to as interrogation pulses 112, which generate a moving magnetic field 114 that travels along waveguide 104. Due to the Wiedemann effect, torsion strain 116 (twist) is induced in waveguide 104 due to the interaction of magnetic field 114 cause by interrogation pulse 112 and magnetic field 110 caused by position magnet 106. Because the current is applied as a pulse, the twist travels along the wire at a known rate. The twist, or mechanical pulse, is detected by sensor head element 102, which may rely on the Villari effect to create a voltage pulse indicating receipt of the mechanical strain wave or in some cases, may rely on a piezo sensor attached to waveguide 104 to create the voltage pulse indicating receipt of the mechanical strain wave.

The time between the interrogation pulse and the detection of the mechanical pulse indicates the location of position magnet 106 along waveguide 104, and therefore, the position of the moving part being measured by sensor 100. The moving part being measured by sensor 100 may include a float position in a tank, an orientation of a valve, etc.

Magnetostrictive sensors provide absolute position information and, unlike incremental encoders, do not need to be re-homed when there is a loss of power. They can also use multiple position magnets with one waveguide, making them well-suited for applications that require position information for multiple components along the same axis, such as level sensors that measure the position of fluids that have different densities in the same tank.

Problems can arise, however, when magnetic field 110 generated by position magnet 106 degrades over time, which reduces the twist in waveguide 104 generated in response to interrogation pulse 112. Another problem can arise when the connection between waveguide 104 and sensor element head 102 (e.g., glue) degrades over time. Both these degrading effects reduce the signal returned to sensor element head 102, which ultimately renders sensor 100 unable to accurately detect the position of position magnet 106. The result is that sensor 100 may fail unexpectedly, which is undesirable. Thus, it is desirable to mitigate the risks associated with unexpected failures that may occur for magnetostrictive sensors and to dynamically compensate for changes in sensor 100 that may occur over time.

BRIEF DESCRIPTION

In one aspect, a system for dynamically adjusting an operation of a magnetostrictive position sensor is provided. The system includes a controller configured to receive an electrical signal from the magnetostrictive position sensor that includes a response pulse, identify factory calibration data that correlates initial recorded values of amplitudes of response pulses received from the magnetostrictive position sensor at different locations of a position magnet along a length of the magnetostrictive position sensor, identify an initial amplitude of the response pulse based on the factory calibration data, calculate a difference between the initial amplitude and an amplitude of the response pulse, determine if the difference is greater than a threshold value, and generate an alert in response to determining that the difference is greater than the threshold value.

In another aspect, a method for dynamically adjusting an operation of a magnetostrictive position sensor is provided. The method includes receiving an electrical signal from the magnetostrictive position sensor that includes a response pulse, identifying factory calibration data that correlates initial recorded values of amplitudes of response pulses received from the magnetostrictive position sensor at different locations of a position magnet along a length of the magnetostrictive position sensor, identifying an initial amplitude of the response pulse based on the factory calibration data, calculating a difference between the initial amplitude and an amplitude of the response pulse, determining if the difference is greater than a threshold value, and generating an alert in response to determining that the difference is greater than the threshold value.

In yet another aspect, a non-transitory computer readable medium including programmed instructions is provided. The programmed instructions, which when executed by a processor, direct the processor to receive an electrical signal from the magnetostrictive position sensor that includes a response pulse, identify factory calibration data that correlates initial recorded values of amplitudes of response pulses received from the magnetostrictive position sensor at different locations of a position magnet along a length of the magnetostrictive position sensor, identify an initial amplitude of the response pulse based on the factory calibration data, calculate a difference between the initial amplitude and an amplitude of the response pulse, determine if the difference is greater than a threshold value, and generate an alert in response to determining that the difference is greater than the threshold value.

DRAWINGS

These and other features, aspects, and advantages of the present disclosure will become better understood when the following detailed description is read with reference to the accompanying drawings in which like characters represent like parts throughout the drawings, wherein.

Figure 1:
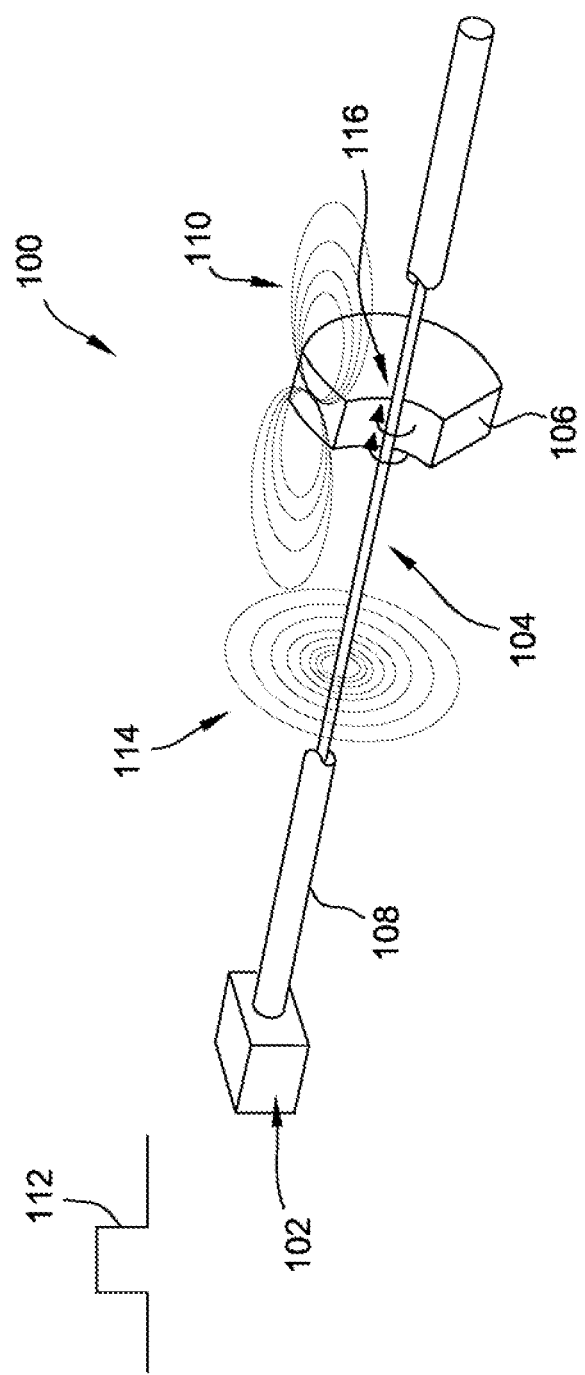
FIG. 1 depicts a known magnetostriction position sensor.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

Figure 2:
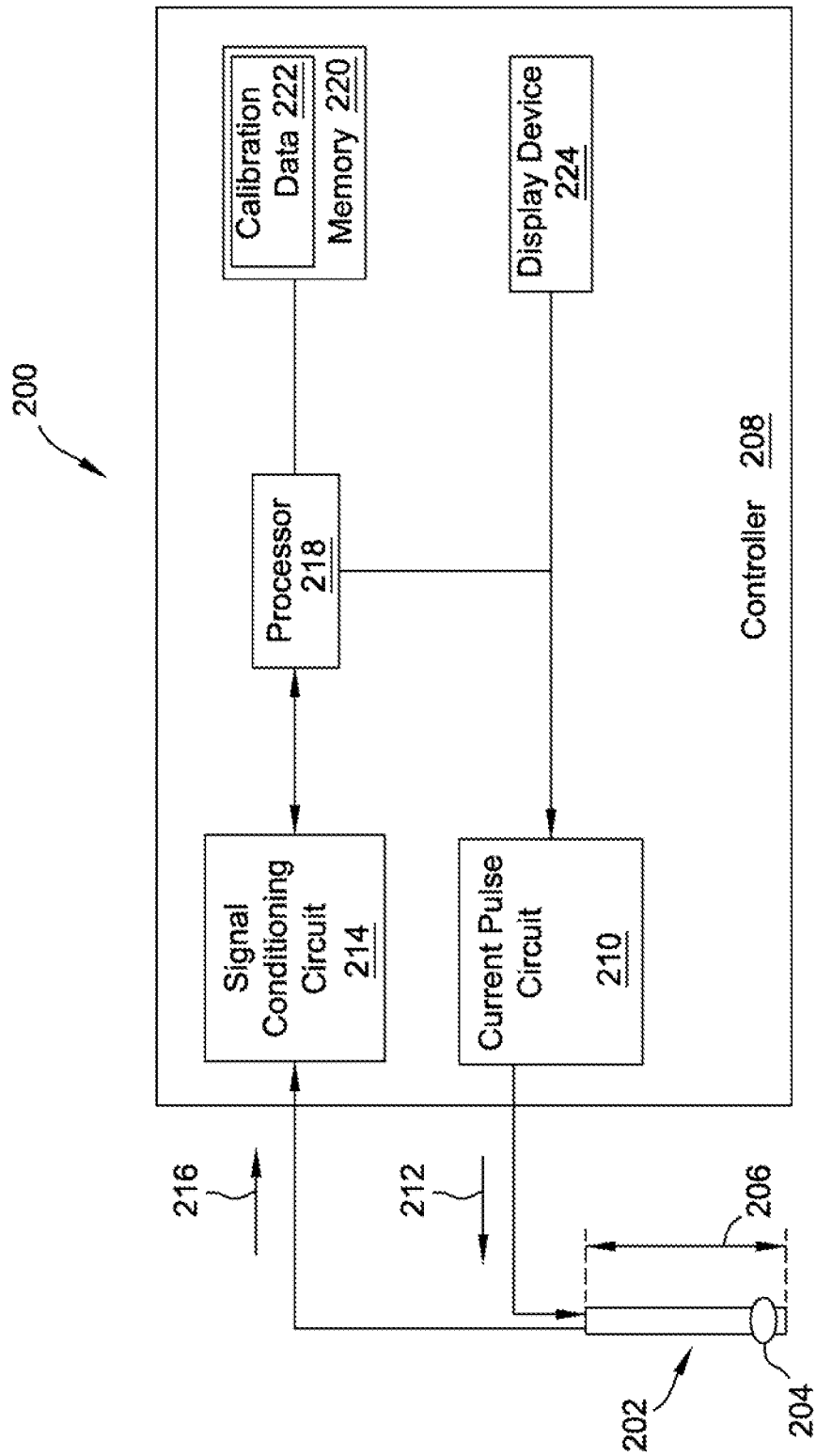
FIG. 2 is a block diagram of a system for dynamically adjusting an operation of a magnetostrictive position sensor in an example embodiment.

FIG. 2 is a block diagram of a system 200 for dynamically adjusting an operation of a magnetostrictive position sensor 202 in an example embodiment. In this embodiment, position sensor 202 includes a position magnet 204 that translates along a length 206 of position sensor 202. System 200 in this embodiment includes a controller 208, which is communicatively coupled to position sensor 202. Controller 208 includes any component, system, or device that interrogates position sensor 202 to determine the position of position magnet 204 along length 206 of position sensor 202 and performs analysis in order to predict possible failures in position sensor 202 and/or to dynamically adjust the operation of position sensor 202.

In this embodiment, controller 208 includes a current pulse circuit 210, which includes any component, system, or device that generates and/or applies interrogation pulses 212 to position sensor 202 in order to determine the location of position magnet 204 along length 206 of position sensor 202. Controller 208 further includes a signal conditioning circuit 214 which includes any component, system, or device that receives electrical signals 216 from position sensor 202 based on interrogation pulses 212. Signal conditioning circuit 214 may include, for example, circuits that amplify electrical signals 216 received from position sensor 202 (e.g., variable gain circuits), circuits that filter electrical signals 216 received from position sensor 202, etc.

Interrogation pulses 212 travel along a waveguide (e.g., a magnetostrictive wire, not shown) within position sensor 202, and the magnetic field generated within the waveguide interacts with position magnet 204, generating a torsional wave within the waveguide that is converted by position sensor 202 into electrical signals 216. A time delay between interrogation pulses 212 and response pulses within electrical signals 216 correlates with the position of position magnet 204 along length 206 of position sensor 202. Position sensor 202 may include float sensors, which measure levels of a fluid and/or translation sensors which provide information about a position or orientation of another device, such as a valve.

Controller 208 in this embodiment further includes a processor 218. Processor 218 includes any component, system, or device which performs one or more functions described herein for controller 208. Controller 208 in this embodiment further includes a memory 220. Memory 220 includes any component, system, or device which stores data. In this embodiment, memory 220 stores calibration data 222 for position sensor 202, which will be described below. In this embodiment, controller 208 further includes a display device 224. Display device 224 includes any component, system, or device that presents information to a user.

Figure 3:
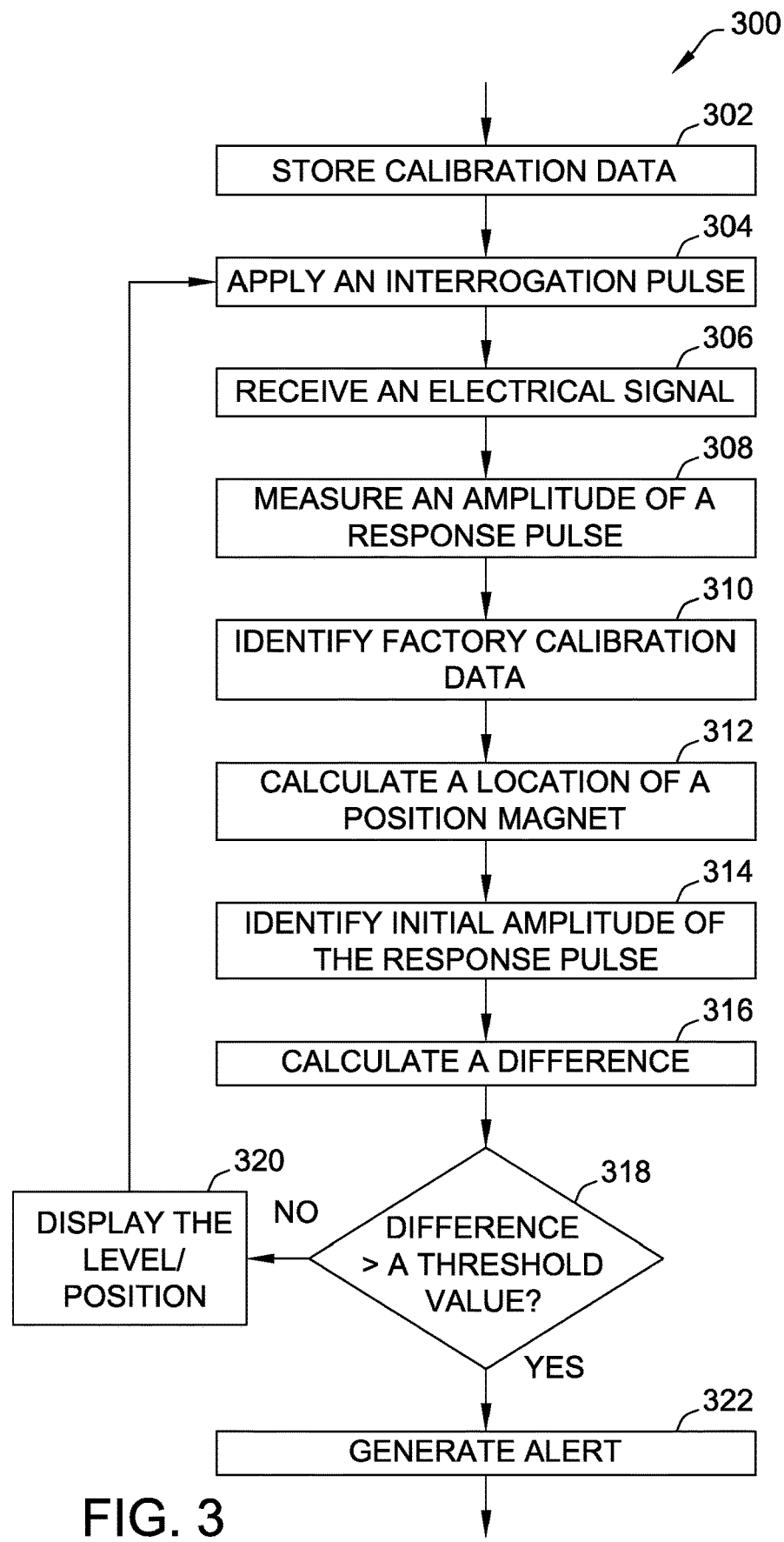
FIG. 3 is a method of dynamically adjusting an operation of a magnetostrictive position sensor in an example embodiment.

FIG. 3 is a flow chart of a method 300 for dynamically adjusting an operation of a magnetostrictive position sensor in an example embodiment. Method 300 will be discussed with respect to system 200 of FIG. 2, although method 300 may be performed by other systems, not shown. The steps of method 300 are not all inclusive, and method 300 may include other steps that are not shown. Further, the steps of method 300 may be performed in an alternative order.

Prior to placing position sensor 202 in service, calibration data 222 may be generated for position sensor 202 (e.g., at the factory), and stored in memory 220 of controller 208 (see FIG. 3, at 302). Calibration data 222 may include, for example various types of information about position sensor 202. Such information may include, for example, information regarding electrical signals 216 received from position sensor 202 while position sensor 202 is a test environment. Such information may include how electrical signals 216 change as position magnet 204 moves along length 206 of position sensor 202. For instance, if length 206 of position sensor 202 is long (e.g., 25-75 feet), then the twist induced in the waveguide of position sensor 202 travels a longer distance as compared to a short sensor (e.g., 1-10 feet), which reduces the amplitude of response pulses present in electrical signals 216 generated by position sensor 202. The result is generally a decay in the amplitude of the response pulses present in electrical signals 216 as position magnet 204 moves to a distal end of position sensor 202. In some embodiments, calibration data 222 may further include initial timestamp information (e.g., a date and time) generated when position sensor 202 is initially calibrated. The initial timestamp information may be used determine a rate of change of various criteria used to evaluate the performance of position sensor 202 over time, which will be described in more detail below.

Figure 4:
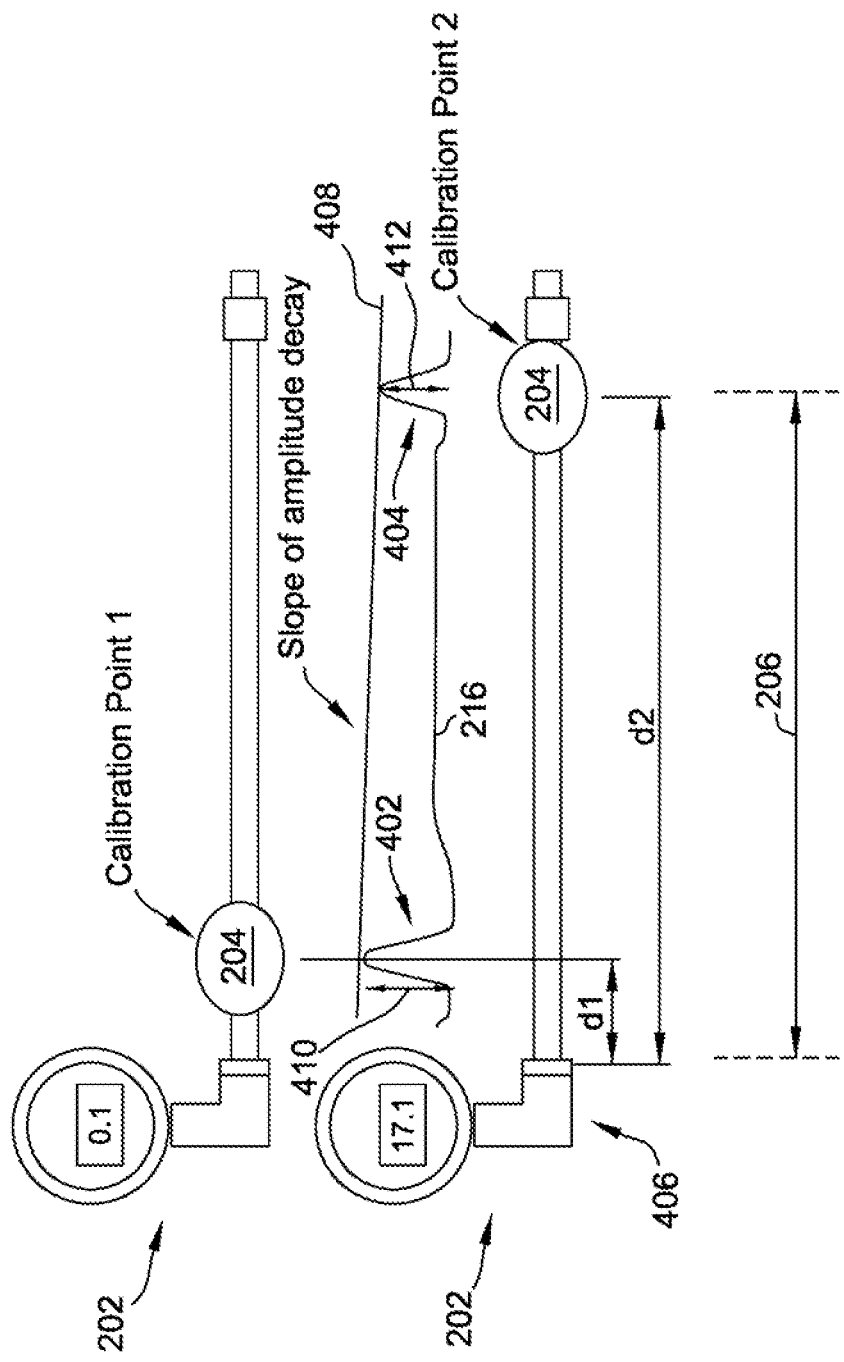
FIG. 4 depicts a magnetostrictive position sensor during a calibration process in an example embodiment.

FIG. 4. depicts one type of calibration that may be performed on position sensor 202 in order to generate calibration data 222 for controller 208. In particular, a first amplitude 410 of a first response pulse 402 in electrical signals 216 may be measured when position magnet 204 is a first distance d1 from a sensor head 406 of position sensor 202, and a second amplitude 412 of a second response pulse 404 in electrical signals 216 may be measured when position magnet 204 is a second distance d2 from sensor head 406. These measurements may be used to calculate the rate of change 408 or amplitude decay slope of response pulses 402, 404 generated by position sensor 202. Generally, sensor head 406 functions to convert strain pulses generated in the waveguide of position sensor 202 (not shown) into electrical signals 216, and it is evident that amplitudes 410, 412 of response pulses 402, 404, respectively, decrease as position magnet 204 moves along length 206 of position sensor 202 away from sensor head 406, which is more pronounced as length 206 increases for position sensor 202. Although only two calibration points are illustrated in FIG. 4, calibration data 222 may include any number of calibration points.

Another type of calibration data 222 that may be calculated for position sensor 202 prior to placing position sensor 202 into service is the signal-to-noise ratio (SNR) of electrical signals 216 generated by position sensor 202, which will be discussed in more detail below.

With calibration data 222 captured in memory 220 of controller 208, position sensor 202 is placed in service. For example, position sensor 202 may be used to determine a level in a tank (e.g., position magnet 204 is attached to a float that moves along length 206 of position sensor 202 depending on the level of the fluid in the tank). During normal operation of position sensor 202, controller 208 interacts with position sensor 202 to calculate the location of position magnet 204 in order to display the level in the tank. Controller 208 also performs analysis on position sensor 202 during normal operation to determine or predict possible failures for position sensor 202, perform automatic adjustments in order to maintain the performance of position sensor 202, etc.

In order to perform these types of processes, controller 208 begins by applying interrogation pulse 212 to position sensor 202 (see FIG. 3, at 304). For example, processor 218 directs current pulse circuit 210 to generate and/or apply interrogation pulse 212 to the waveguide (not shown) of position sensor 202. Controller 208 receives electrical signal 216 from position sensor 202 in response to interrogation pulse 212 (see FIG. 3, at 306). For example, interrogation pulse 212 generates a magnetic field in the waveguide of position sensor 202, which interacts with position magnet 204 and generates a torsional wave in the waveguide. The torsional wave travels along the waveguide and is converted into electrical signal 216 (which includes a response pulse), and is received by signal conditioning circuit 214 of controller 208. Signal conditioning circuit 214 may perform various signal processing steps to electrical signal 216, including filtering processes, gain adjustment processes, etc.

Controller 208 measures an amplitude of the response pulse (see FIG. 3, at 308). In one example, processor 218 samples electrical signal 216 using an integrated analog-to-digital converter (ADC) to measure the amplitude of the response pulses. In another example, peak detection circuits or a separate ADC in signal conditioning circuit 214 is used to measure the amplitude of the response pulse.

Controller 208 identifies calibration data 222 that correlates the initial recorded values of response pulses at different locations along length 206 of position sensor 202 (see FIG. 3, at 310). For example, processor 218 recovers calibration data 222 stored in memory 220, which was generated prior to placing position sensor 202 into service.

Controller 208 then calculates a location of position magnet 204 along length 206 of position sensor 202 based on a time delay between interrogation pulse 212 and the response pulse in electrical signal 216 (see FIG. 3, at 312). For example, processor 218 or some other dedicated hardware (e.g., a programmable logic device) may perform a high-accurate measurement of the time delay between interrogation pulse 212 and the response pulse in electrical signal 216, and use the time delay as an entry in a lookup table or transfer function associated with position sensor 202. In some embodiments, the lookup table or transfer function may be stored in calibration data 222, generated during the factory calibration for position sensor 202. For instance, the time delays associated with response pulses 402, 404 (see FIG. 4) may be used to derive a function of time delay over length 206 of position sensor 202.

Using the location of position magnet 204 and calibration data 222, controller 208 identifies an initial amplitude of the response pulse in electrical signal 216. For example, if position magnet 204 is located at d1 (depicted in FIG. 4), then the initial amplitude of response pulse 402 corresponds to amplitude 410, stored in calibration data 222. If position magnet 204 is located at d2 (depicted in FIG. 4), then the initial amplitude of response pulse 404 corresponds to amplitude 412, also stored in calibration data 222. If position magnet 204 is located between d1 and d2, then the amplitude of the corresponding response pulse varies as a function of rate of change 408, also stored in calibration data 222.

Controller 208 calculates a difference between the initial amplitude of the response pulse and the measured amplitude of the response pulse. Differences may arise, for example, due to aging of position sensor 202. For instance, the magnetic field generated by position magnet 204 may decrease over time, which reduces the twist induced in the waveguide of position sensor 202 in response to interrogation pulses 212. In another example, the mechanical attachment of the waveguide of position sensor 202 to its sensor head 406 may degrade over time, which reduces the ability of position sensor 202 to detect the twist in the waveguide.

Controller 208 determines if the difference is greater than a threshold value (see FIG. 3, at 318), and generates an alert (e.g., using display device 224, see FIG. 3, at 322) if the difference between the initial amplitudes of the response pulses and the measure amplitude of the response pulse is greater than the threshold value. For example, an alert may be generated if the measured amplitude of the response pulse while position sensor 202 is in service is about 70% of the initial amplitude at calibration, about 65%, about 75%, about 80%, between about 50% and about 80%, or some other suitable value. The alert may, for example, provide information to a maintenance worker about the type of error (e.g., degraded performance of position sensor 202), thereby allowing the maintenance worker to schedule maintenance or a replacement activity for position sensor 202. If the difference is not greater than the threshold value, then the controller 208 displays the level/position information based on the location of position magnet 204 along length 206 of position sensor 202 (see FIG. 3, at 320).

In some embodiments, controller 208 analyzes the rate of change of the difference over time in order to generate an alert and/or to provide a suggestion for scheduling maintenance and/or to indicate a pending failure of position sensor 202 (e.g., using display device 224). For instance, controller 208 may provide a suggestion for scheduling maintenance if the rate of change is less than a threshold rate, while indicating a pending failure of position sensor 202 if the rate of change is greater than the threshold rate. However, controller 208 may utilize other criteria when generating alerts, and/or providing suggestions for scheduling maintenance, and/or for indicating a pending failure, such as utilizing differing thresholds for the rate of change, the acceleration of the rate of change over time, etc.

In some embodiments, controller 208 generates a timestamp upon first determining that the difference is greater than the threshold value (e.g., the first application of dynamic compensation for this criteria), and utilizes the initial timestamp stored in calibration data 222 in order to calculate a rate of change of the difference over time. In other embodiments, controller 208 generates and stores in memory 220, timestamps when dynamic compensation is performed based on the difference being greater than the threshold value. In this embodiment, controller 208 utilizes successive timestamps and/or timestamps in a temporal sequence in order to calculate the rate of change of the difference over time.

In some embodiments, controller 208 amplifies electrical signal 216 received from position sensor 202 in response to determining that the difference is greater than the threshold value. For instance, processor 218 may vary an input amplifier gain stage at signal conditioning circuit 214, which increases the amplitude of response pulses received from position sensor 202. However, increasing the gain applied to electrical signals 216 amplifies both the response pulses and the noise included in electrical signals 216, which can be mitigated in other ways, described below.

In some embodiments, controller 208 calculates a rate of change of amplitudes of the response pulses over length 206 of position sensor 202 (e.g., an amplitude decay slope), determines if the rate of change is greater than a target rate of change, and generates an alert in response to determining that the rate of change is greater than a target rate of change. For example, during operation of position sensor 202, movement of position magnet 204 along length 206 of position sensor 202 allows amplitudes of response pulses generated by position sensor 202 to be recorded, which are used to generate a new decay rate or rate function for the amplitudes over length 206. When the rate varies from the rate initially determined in calibration (e.g., amplitude 412 of response pulse 404 at d2 is greater than what is measured when position magnet 204 is at d2 while position sensor 202 is in service), then an alert may be generated indicating a problem with position sensor 202 (e.g., problems with sensor head 406). Another type of problem that can arise is when position sensor 202 is flexible and is bent by accident while in service. In this case, the amplitude of the response pulses when position magnet 204 is located at about d1 may be similar to amplitude 410, recorded in calibration, but the amplitude of response pulses when position magnet 204 is located at about d2 may be less than, or substantially less than, amplitude 412, recorded in calibration. This particular case is detectable and reportable as an alert. For instance, controller 208 may utilize display device 224 to indicate to a user that position sensor 202 is bent, thereby allowing the user to correct the situation. In some embodiments, controller 208 may modify a comparison value used to identify the response pulse in electrical signal 216 when position sensor 202 is bent, thereby improving the performance of system 200.

In some embodiments, controller 208 analyzes the rate of change of the amplitude decay slope over time in order to generate an alert and/or to provide a suggestion for scheduling maintenance and/or to indicate a pending failure of position sensor 202 (e.g., using display device 224). For instance, controller 208 may provide a suggestion for scheduling maintenance if the rate of change of the amplitude decay slope is less than a threshold rate, while indicating a pending failure of position sensor 202 if the rate of change of the amplitude decay slope is greater than the threshold rate. However, controller 208 may utilize other criteria when generating alerts, and/or providing suggestions for scheduling maintenance, and/or for indicating a pending failure, such as utilizing differing thresholds for the rate of change of the amplitude decay slope, the acceleration of the rate of change over time of the amplitude decay slope, etc.

In some embodiments, controller 208 generates a timestamp upon first determining that the amplitude decay slope is greater than the target rate (e.g., the first application of dynamic compensation for this criteria), and utilizes the initial timestamp stored in calibration data 222 in order to calculate a rate of change of the amplitude decay slope over time. In other embodiments, controller 208 generates and stores in memory 220, timestamps when dynamic compensation is performed based on the amplitude decay slope being greater than the target rate. In this embodiment, controller 208 utilizes successive timestamps and/or timestamps in a temporal sequence in order to calculate the rate of change of the amplitude decay slope over time.

Figure 5:
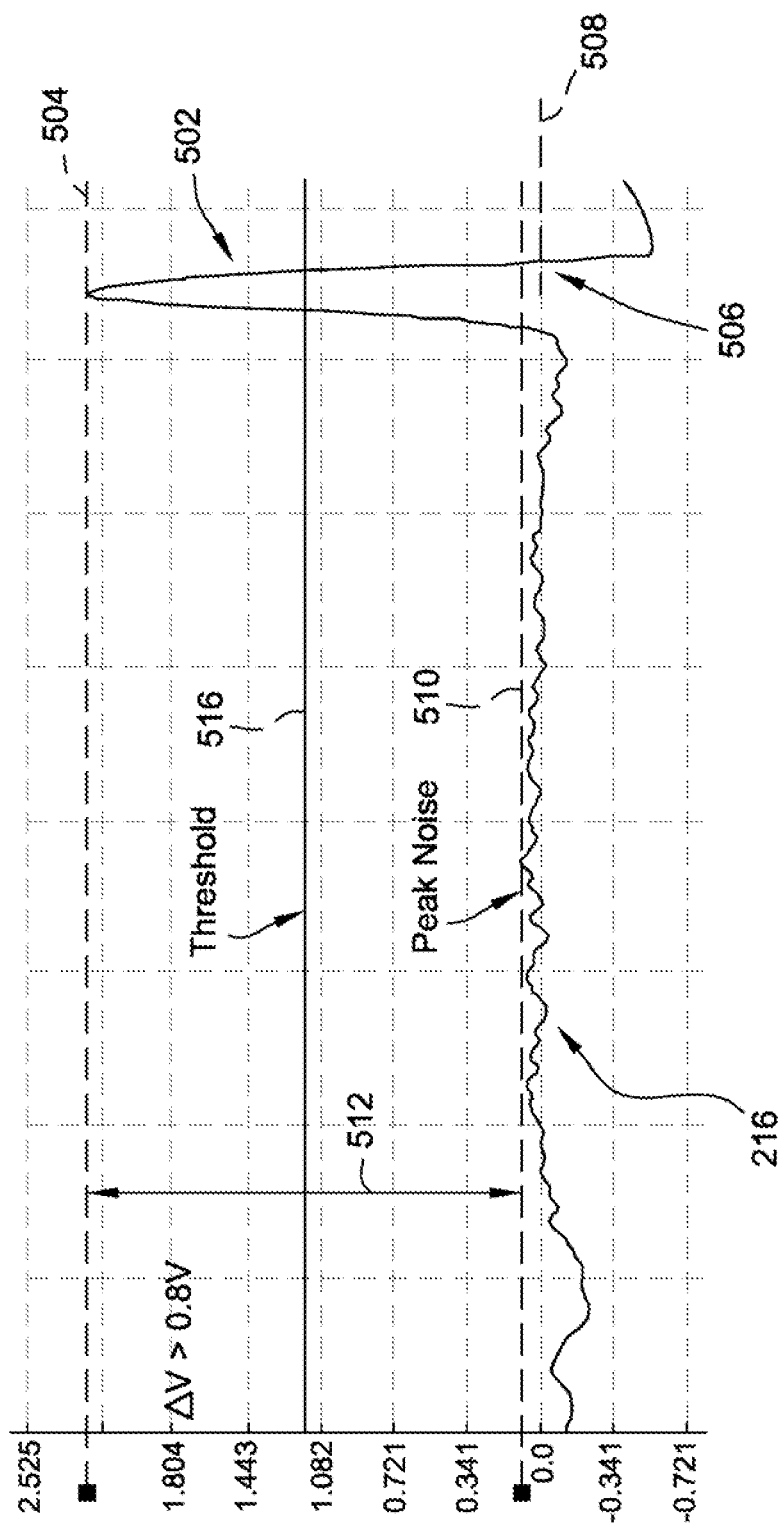
FIG. 5 depicts an electrical signal and a response pulse received from a magnetostrictive position sensor in an example embodiment.

FIG. 5 depicts electrical signal 216 and a response pulse 502 in an example embodiment. In this embodiment, response pulse 502 is depicted as having an amplitude 504. A threshold 516 (i.e., a comparison value) is used by controller 208 when analyzing electrical signal 216 from position sensor 202 to detect or determine when response pulse 502 is valid and also for determining the time delay between interrogation pulses 212 and response pulse 502 for locating position magnet 204 along length 206 of position sensor 202. For example, controller 208 may consider the end of the time delay to occur at point 506 in FIG. 5 when response pulse 502 is negative-crossing on threshold 516 and is zero-crossing at a zero-voltage level 508.

In some embodiments, controller 208 dynamically adjusts threshold 516 in response to various parameters measured in electrical signal 216. For instance, controller 208 may adjust threshold 516 in response to determining that position sensor 202 is bent.

Figure 6:
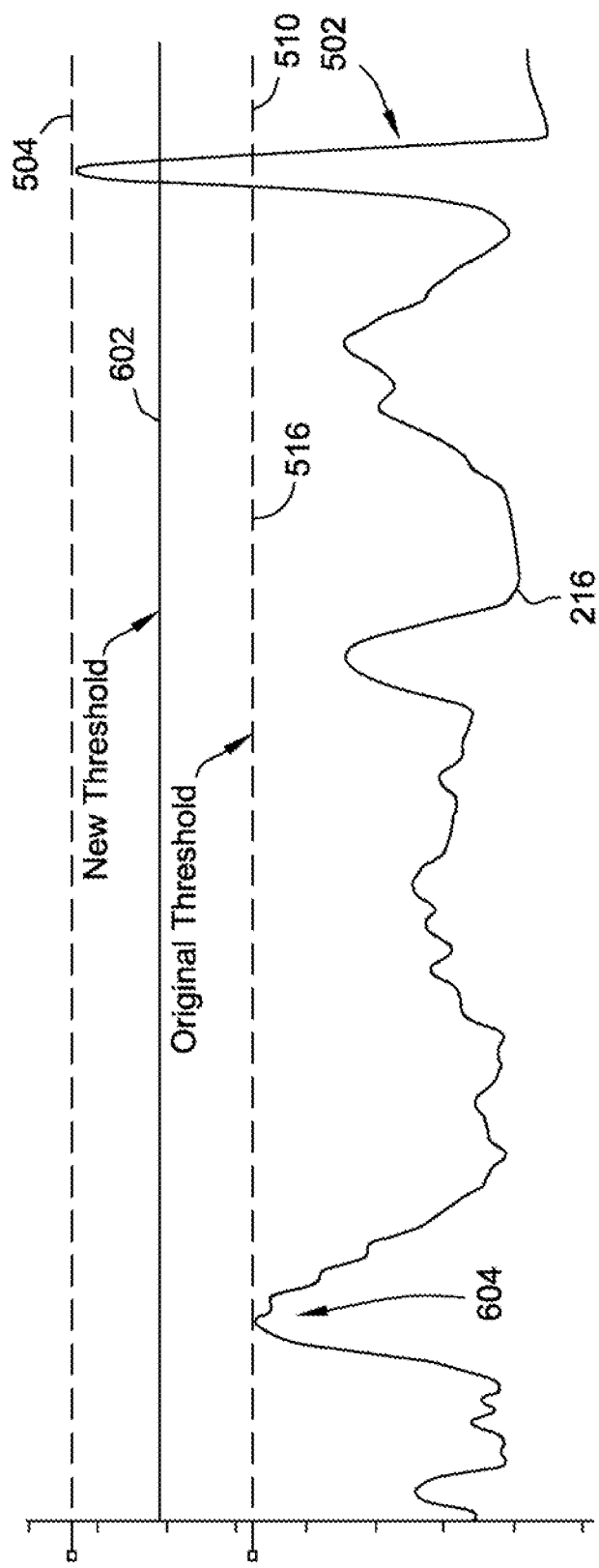
FIG. 6 depicts a dynamic adjustment process in an example embodiment.

In one embodiment, controller 208 measures a peak amplitude 510 of noise in electrical signal 216, determines a difference 512 between peak amplitude 510 of the noise and amplitude 504 of response pulse 502, and modifies threshold 516 when difference 512 is less than a threshold amount. For instance, it may be desirable that threshold 516 is about half of difference 512 is some embodiments. This type of dynamic modification while position sensor 202 is in operation enables controller 208 to respond to different noise environments that may be changing over time, which may modify the value of peak amplitude 510 of the noise in electrical signal 216. FIG. 6 depicts one example of this process whereby a new threshold 602 is used in response to changes in peak amplitude 510 of noise 604 present in electrical signal 216.

In some embodiments, controller 208 dynamically makes changes in how it operates based on changes in the SNR of electrical signals 216. For instance, calibration data 222 may store initial SNR information captured during calibration for position sensor 202, and processor 218 may dynamically calculate the SNR of electrical signals 216 during operation, determining the differences between the initial SNR for position sensor 202 and the measured SNR for position sensor 202. Controller 208 may also generate alerts when the initial SNR and the measured SNR differ from each other by a target SNR. In some embodiments, controller 208 may take additional actions, such as adjusting the gain applied to electrical signal 216, modifying threshold 516, etc., in response to changes in the measured values of SNR for electrical signals 216 during operation of position sensor 202.

In some embodiments, controller 208 analyzes the rate of change of the SNR over time in order to generate an alert and/or to provide a suggestion for scheduling maintenance and/or to indicate a pending failure of position sensor 202 (e.g., using display device 224). For instance, controller 208 may provide a suggestion for scheduling maintenance if the rate of change is less than a threshold rate, while indicating a pending failure of position sensor 202 if the rate of change is greater than the threshold rate. However, controller 208 may utilize other criteria when generating alerts, and/or providing suggestions for scheduling maintenance, and/or for indicating a pending failure, such as utilizing differing thresholds for the rate of change, the acceleration of the rate of change over time, etc.

In some embodiments, controller 208 generates a timestamp upon first determining that the difference between the initial SNR and the measured SNR differ from each other by the target SNR (e.g., the initial application of dynamic compensation for this criteria), and utilizes the initial timestamp stored in calibration data 222 in order to calculate a rate of change of the SNR over time. In other embodiments, controller 208 generates and stores in memory 220, timestamps when dynamic compensation is performed based on the SNR. In this embodiment, controller 208 utilizes successive timestamps and/or timestamps in a temporal sequence in order to calculate the rate of change of the SNR over time.

In yet another embodiment, controller 208 dynamically adjusts to different noise sources that may affect electrical signal 216 over time. In this embodiment, controller 208 measures peak amplitude 510 of noise in electrical signal 216 and calculates a sum of a magnitude of the noise in electrical signal 216. Controller 208 then calculates a ratio of the peak amplitude 510 of the noise and the sum of the magnitude of the noise, determines if the ratio is greater than a threshold ratio, and modifies threshold 516 when the ratio is greater than the threshold ratio. In some embodiments, controller 208 may generate an alert indicating such and/or adjusting the gain applied to electrical signal 216.

An example technical effect of the apparatus and method described herein includes one or more of: (a) adjusting the operation of magnetostrictive position sensors as components on magnetostrictive position sensors age; (b) dynamically altering the operation of magnetostrictive position sensors in the presence of noise; (c) providing real-time or near real-time status for magnetostrictive position sensors to operators; (d) detecting fault conditions in magnetostrictive position sensors including bent probes; and (e) dynamically adjusting the operation of magnetostrictive position sensors based on changes in noise sources.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for dynamically adjusting an operation of a magnetostrictive position sensor, the system comprising:
   a controller configured to:
      receive an electrical signal from the magnetostrictive position sensor that includes a response pulse;
      identify factory calibration data that correlates initial recorded values of amplitudes of response pulses received from the magnetostrictive position sensor at different locations of a position magnet along a length of the magnetostrictive position sensor;
      identify an initial amplitude of the response pulse based on the factory calibration data;
      calculate a difference between the initial amplitude and an amplitude of the response pulse;
      determine if the difference is greater than a threshold value; and
      generate an alert in response to determining that the difference is greater than the threshold value.

2. The system of claim 1, wherein:
the controller is further configured to:
amplify the electrical signal in response to determining that the difference is greater than the threshold value.

3. The system of claim 1, wherein:
the controller is further configured to:
calculate a rate of change of amplitudes of response pulses over the length of the magnetostrictive position sensor;
determine if the rate of change is greater than a target rate of change; and
generate the alert in response to determining that the rate of change is greater than the target rate of change.

4. The system of claim 1, wherein:
the controller is further configured to:
generate a timestamp in response to determining that the difference is greater than the threshold value;
calculate a rate of change of the difference based on the timestamp and an initial timestamp generated along with the factory calibration data;
determine that the rate of change of the difference greater than a target rate of change; and
generate an alert indicating at least one of scheduling maintenance of the magnetostrictive position sensor and a pending failure of the magnetostrictive position sensor in response to determining that the rate of change is greater than the target rate of change.

5. The system of claim 1, wherein:
the controller is further configured to:
measure a peak amplitude of noise in the electrical signal;
determine a difference between the peak amplitude of the noise and the amplitude of the response pulse;
determine if the difference is less than a threshold amount; and
modify a comparison value used to identify the response pulse in the electrical signal in response to determining that the difference is less than the threshold amount.

6. The system of claim 1, wherein:
the factory calibration data includes an initial signal-to-noise ratio for electrical signals generated by the magnetostrictive position sensor in response to interrogation pulses, and
the controller is further configured to:
measure a signal-to-noise ratio for the electrical signal;
identify the initial signal-to-noise ratio based on the factory calibration data;
calculate a difference between the measured signal-to-noise ratio and the initial signal-to-noise ratio;
determine if the difference is less than a target signal-to-noise ratio; and
generate the alert in response to determining that the difference is less than the target signal-to-noise ratio.

7. The system of claim 1, wherein:
the controller is further configured to:
measure a peak amplitude of noise in the electrical signal;
calculate a sum of a magnitude of the noise in the electrical signal;
calculate a ratio of the peak amplitude of the noise and the sum of the magnitude of the noise;
determine if the ratio is greater than a threshold ratio; and
modify a comparison value used to identify the response pulse in the electrical signal in response to determining that the ratio is greater than the threshold ratio.

8. A method for dynamically adjusting an operation of a magnetostrictive position sensor, the method comprising:
receiving an electrical signal from the magnetostrictive position sensor that includes a response pulse;
identifying factory calibration data that correlates initial recorded values of amplitudes of response pulses received from the magnetostrictive position sensor at different locations of a position magnet along a length of the magnetostrictive position sensor;
identifying an initial amplitude of the response pulse based on the factory calibration data;
calculating a difference between the initial amplitude and an amplitude of the response pulse;
determining if the difference is greater than a threshold value; and
generating an alert in response to determining that the difference is greater than the threshold value.

9. The method of claim 8, further comprising:
amplifying the electrical signal in response to determining that the difference is greater than the threshold value.

10. The method of claim 8, further comprising:
calculating a rate of change of amplitudes of response pulses over the length of the magnetostrictive position sensor;
determining if the rate of change is greater than a target rate of change; and
generating the alert in response to determining that the rate of change is greater than the target rate of change.

11. The method of claim 8, further comprising:
generating a timestamp in response to determining that the difference is greater than the threshold value;
calculating a rate of change of the difference based on the timestamp and an initial timestamp generated along with the factory calibration data;
determining that the rate of change of the difference greater than a target rate of change; and
generating an alert indicating at least one of scheduling maintenance of the magnetostrictive position sensor and a pending failure of the magnetostrictive position sensor in response to determining that the rate of change is greater than the target rate of change.

12. The method of claim 8, further comprising:
measuring a peak amplitude of noise in the electrical signal;
calculating a difference between the peak amplitude of noise and the amplitude of the response pulse;
determining if the difference is less than a threshold amount; and
modifying a comparison value used to identify the response pulse in the electrical signal in response to determining that the difference is less than the threshold amount.

13. The method of claim 8, wherein:
the factory calibration data includes an initial signal-to-noise ratio for electrical signals generated by the magnetostrictive position sensor in response to interrogation pulses, and
the method further comprises:
measuring a signal-to-noise ratio for the electrical signal;
identifying the initial signal-to-noise ratio based on the factory calibration data;

calculating a difference between the measured signal-to-noise ratio and the initial signal-to-noise ratio;

determining if the difference is less than a target signal-to-noise ratio; and generating the alert in response to determining that the difference is less than the target signal-to-noise ratio.

14. The method of claim 8, further comprising:

measuring a peak amplitude of noise in the electrical signal;

calculating a sum of a magnitude of the noise in the electrical signal;

calculating a ratio of the peak amplitude of the noise and the sum of the magnitude of the noise;

determining if the ratio is greater than a threshold ratio; and modifying a comparison value used to identify the response pulse in the electrical signal in response to determining that the ratio is greater than the threshold ratio.

15. A non-transitory computer readable medium including programmed instructions which, when executed by a processor, direct the processor to:

receive an electrical signal from a magnetostrictive position sensor that includes a response pulse;

identify factory calibration data that correlates initial recorded values of amplitudes of response pulses received from the magnetostrictive position sensor at different locations of a position magnet along a length of the magnetostrictive position sensor;

identify an initial amplitude of the response pulse based on the factory calibration data;

calculate a difference between the initial amplitude and an amplitude of the response pulse;

determine if the difference is greater than a threshold value; and generate an alert in response to determining that the difference is greater than the threshold value.

16. The non-transitory computer readable medium of claim 15, wherein the programmed instructions further direct the processor to:

amplify the electrical signal in response to determining that the difference is greater than the threshold value.

17. The non-transitory computer readable medium of claim 15, wherein the programmed instructions further direct the processor to:

calculate a rate of change of amplitudes of response pulses over the length of the magnetostrictive position sensor;

determine if the rate of change is greater than a target rate of change; and generate the alert in response to determining that the rate of change is greater than the target rate of change.

18. The non-transitory computer readable medium of claim 15, wherein the programmed instructions further direct the processor to:

generate a timestamp in response to determining that the difference is greater than the threshold value;

calculate a rate of change of the difference based on the timestamp and an initial timestamp generated along with the factory calibration data;

determine that the rate of change of the difference greater than a target rate of change; and generate an alert indicating at least one of scheduling maintenance of the magnetostrictive position sensor and a pending failure of the magnetostrictive position sensor in response to determining that the rate of change is greater than the target rate of change.

19. The non-transitory computer readable medium of claim 15, wherein the programmed instructions further direct the processor to:

measure a peak amplitude of noise in the electrical signal;

calculate a difference between the peak amplitude of the noise and the amplitude of the response pulse;

determine if the difference is less than a threshold amount; and modify a comparison value used to identify the response pulse in the electrical signal in response to determining that the difference is less than the threshold amount.

20. The non-transitory computer readable medium of claim 15, wherein:

the factory calibration data includes an initial signal-to-noise ratio for electrical signals generated by the magnetostrictive position sensor in response to interrogation pulses, and the programmed instructions further direct the processor to:

measure a signal-to-noise ratio for the electrical signal;

identify the initial signal-to-noise ratio based on the factory calibration data;

calculate a difference between the measured signal-to-noise ratio and the initial signal-to-noise ratio;

determine if the difference is less than a target signal-to-noise ratio; and generate the alert in response to determining that the difference is less than the target signal-to-noise ratio.

* * * * *